Feb. 18, 1936.  C. E. DORSEY, JR  2,031,256
SEMIAUTOMATIC FIFTH WHEEL CONSTRUCTION
Filed March 28, 1935  2 Sheets-Sheet 1

Inventor
Claude E. Dorsey, Jr.
By L. F. Randolph Jr.
Attorney

Feb. 18, 1936.  C. E. DORSEY, JR  2,031,256

SEMIAUTOMATIC FIFTH WHEEL CONSTRUCTION

Filed March 28, 1935  2 Sheets-Sheet 2

Inventor
Claude E. Dorsey, Jr.
By L. F. Randolph Jr.
Attorney

Patented Feb. 18, 1936

2,031,256

UNITED STATES PATENT OFFICE 2,031,256

SEMIAUTOMATIC FIFTH WHEEL CONSTRUCTION

Claude E. Dorsey, Jr., Elba, Ala.

Application March 28, 1935, Serial No. 13,569

2 Claims. (Cl. 280—33.1)

This invention relates to a semiautomatic fifth wheel construction.

It is generally aimed to provide a device of this character which will serve as a coupling or connection between a draft vehicle and a trailer, and particularly to provide a construction whereby the latch will be automatically closed and fastened in closed position when the trailer backs to engage a king pin with the latch, comprising the spring associated with the latch, so that such spring will cause automatic opening of the latch upon release of the latch.

It is further aimed to provide a novel structure whereby road shocks are cushioned.

The more specific objects and advantages will become apparent from a consideration of the description following taken in connection with accompanying drawings illustrating an operative embodiment.

In said drawings:—

Figure 1:
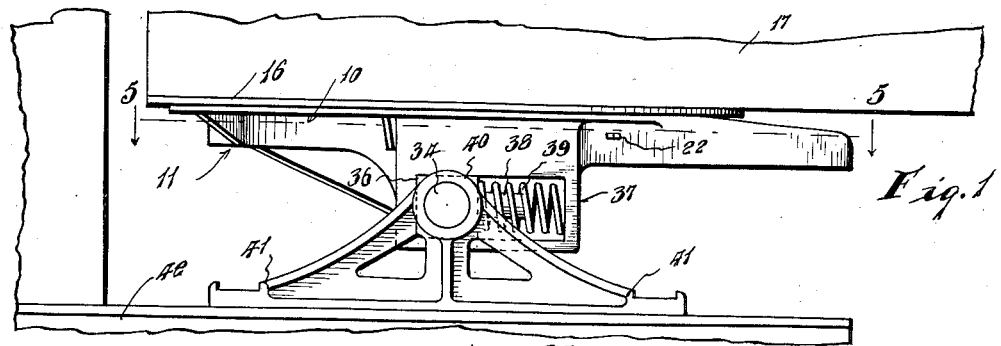
Figure 1 is a view in side elevation, primarily showing the improved fifth wheel construction, also fragmentarily showing the connection of the trailer.
Figure 2:
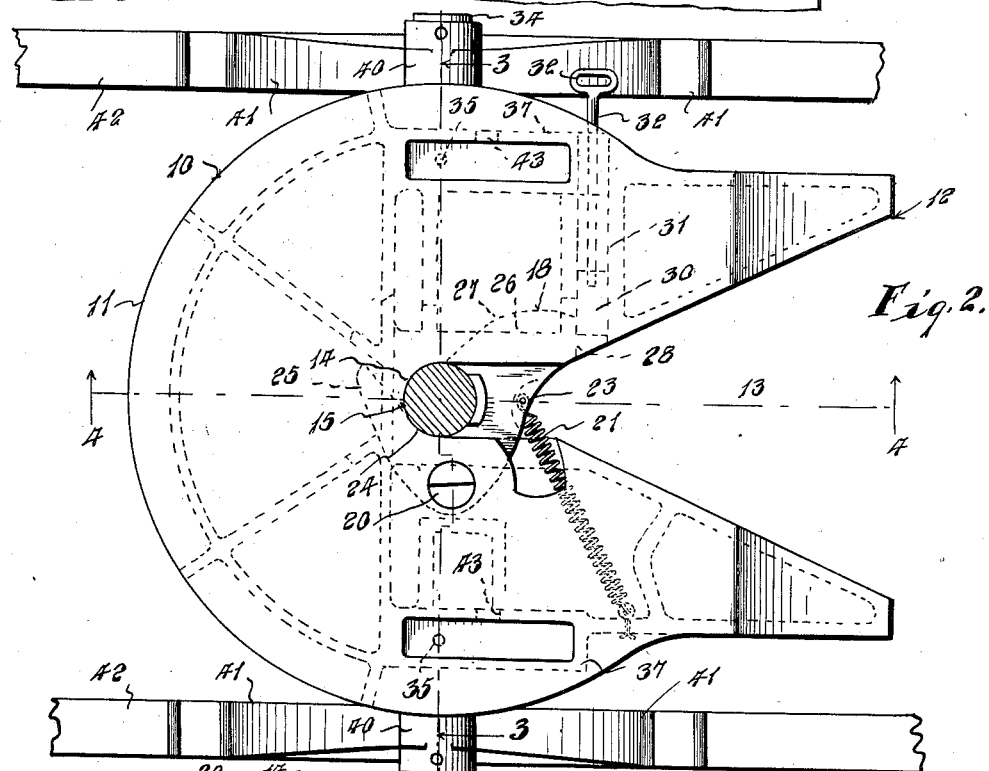
Figure 2 is a view primarily in plan showing the improved fifth wheel construction, with a king pin of a trailing vehicle latched in position.
Figure 3:
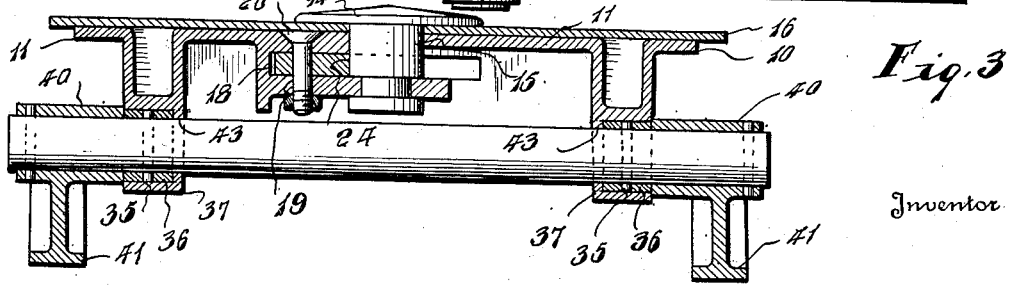
Figure 3 is a transverse sectional view taken on the line 3—3 of Figure 2.
Figure 4:
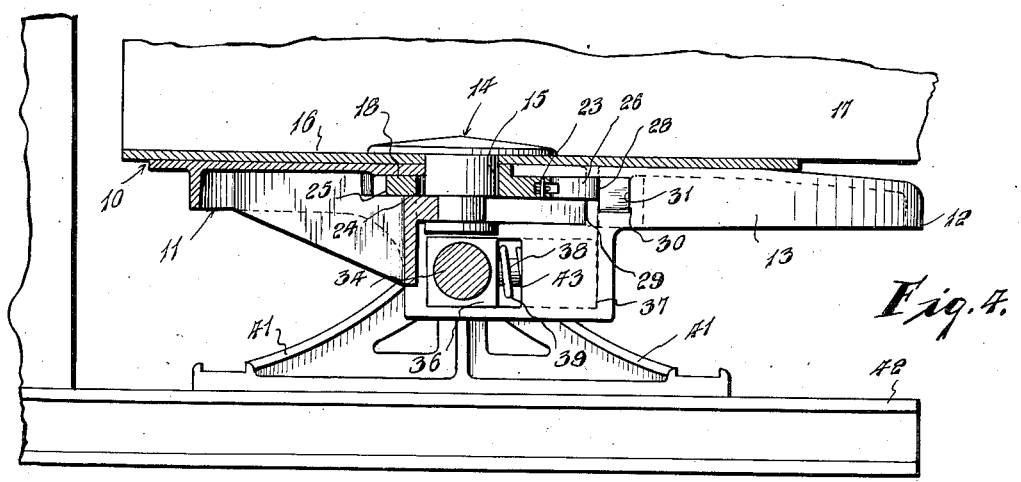
Figure 4 is a longitudinal sectional view through the parts of Figure 1.

Referring specifically to the drawings, the improved fifth wheel construction is shown generally at 10. The same comprises a body conveniently formed as a metallic casting of strong, though light, skeleton form, as shown, one end being bifurcated as at 12 to provide a flared entrance throat for the guidance of a king pin 14 into a journal portion 15.

Said king pin 14 is connected to a plate 16 which in turn is fastened to a trailing vehicle fragmentarily suggested at 17. Said king pin 14 is fastened in its closed position within the journal portion or socket 15 by means of a latch 18, pivoted to a portion 19 of the body 11 by means of a vertical bolt or pin 20. Said latch 18 is operable in a horizontal plane and it is normally urged away from the socket 15 through the contractile action of a coil spring 21 anchored at 22 to the body 11 and fastened at 23 to said latch 18. Said latch has an open socket portion 24 which fits substantially 180 degrees about the king pin 14 and it also has opposite arms 25 and 26, the latter arm having a curved or cam edge at 27, and a straight end as at 28.

Figure 5:
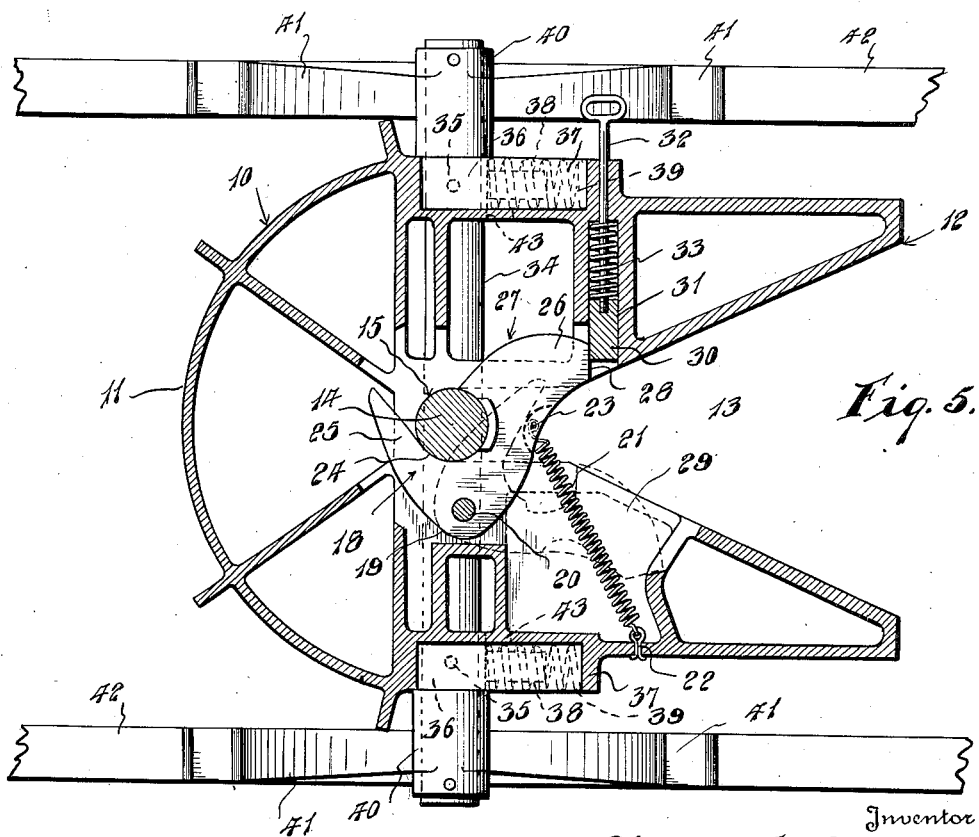
Figure 5 is a horizontal sectional view through the parts of Figure 1, being taken on the line 5—5 of said figure.

Said latch 18 is disposed between the top and bottom of the body 11 and it operates in a space 29, so that in the open position, as suggested in dotted lines in Figure 5, the arm 26 is practically completely located within the body 11 with the arm 25 disposed in the path of reception of the king pin 14.

A securing block 30 is adapted to be displaced by the engagement of cam surface 27 of the latch 18 therewith, as the latch moves to fastening position, and to thereupon extend across the end 28, as shown in full lines in Figure 5 to secure or fasten the latch 18 in king pin-securing position. Said latch 30 is slidable in a horizontal plane transversely of the body 11 within housing 31 provided therein. A rod or handle 32 is fastened to the block 30 and extends slidably through a portion of the body 11. A coil spring 33 surrounds the rod 32 within the housing 31, abutting the block 30 at one end and the housing at the other end and serving to urge the lock 30 into the locking or full line position of Figure 5. Upon retracting or pulling the rod 32 outwardly the spring 21, which is tensioned through the movement of the latch 18 to closed position, will urge such latch to the open or dotted line position shown in Figure 5, as the trailing vehicle moves away from the drawing vehicle or vice versa.

It is clear that when the latch is in the dotted line position of Figure 5, upon the trailer backing, the king pin 14 carried thereby will move the latch into the closed or full line position of Figure 5 wherein it is automatically locked or secured by the block 30, which is moved outwardly by the engagement of surface 27 therewith, until the shoulder 28 passes the same. Spring 21 is tensioned through this movement of the latch, so that upon subsequent release of the latch by retracting the rod 32 and block 30, said spring 21 will urge movement of the latch to the dotted line position of Figure 5.

Novel means are provided whereby the body 11 is secured to a drawing vehicle in a manner to absorb road shocks. To this end, a shaft or bar 34 is disposed transversely of the body 11 in a loose manner. Fastened to such shaft 34 as by pins 35, are rectangular blocks 36 which are longitudinally slidable in boxes 37 forming integral parts of the body 11, and open at their outer sides as shown. Said blocks have studs 38 thereon located within the boxes 37 and the open sides of the latter permit the insertion of coil springs 39, so as to surround the studs 38 and abut the blocks 36 and opposite ends of the boxes. Said springs 39 are expansive. Outwardly of the body 11, the ends of shaft 34 are disposed in sleeves 40 of brackets 41 attached to side beams 42 or otherwise to parts of the draft vehicle. It will be realized upon an obstruction being encountered on the road by the draft or trailing vehicle, that relative movement, cushioned by the springs 39, will take place between the shaft 34 and the body 11, guided by the sliding of the blocks 36 in the boxes 37. Said boxes are cut away as at 43 to accommodate the said movement of the shaft 34.

Various changes may be resorted to provided they fall within the spirit and scope of the invention.

What is claimed is:—

1. A fifth wheel structure of the class described having a body provided with a socket to receive a king pin, a latch to secure the king pin to the body, means pivoting said latch to the body, said latch having an arm disposable in the path of engagement of the king pin with the socket, whereby the latch will be moved by the king pin to closed position, a spring connected to the latch and to the body urging opening movement of the latch, and a securing means for the latch automatically engageable therewith when the latch is in closed position, comprising a slide, spring means urging said slide into the path of opening movement of the latch, said latch having a second arm, said second arm having a cam surface engageable with said slide to displace the slide as the latch moves to latching position.

2. A fifth wheel structure of the class described having a body provided with a socket to receive a king pin, a latch to secure the king pin to the body, means pivoting said latch to the body, said latch having an arm disposable in the path of engagement of the king pin with the socket, whereby the latch will be moved by the king pin to closed position, a coil spring connected to the latch and to the body urging opening movement of the latch, and a securing means for the latch automatically engageable therewith when the latch is in closed position, comprising a slide, spring means urging said slide into the path of opening movement of the latch, and means operable manually to displace said slide, said body being of skeleton form and having a flared entrance throat to guide the king pin to said socket, said latch having a second arm, said second arm having a cam surface engageable with said slide to displace the slide as the latch moves to latching position.

CLAUDE E. DORSEY, Jr.